Figure 1:
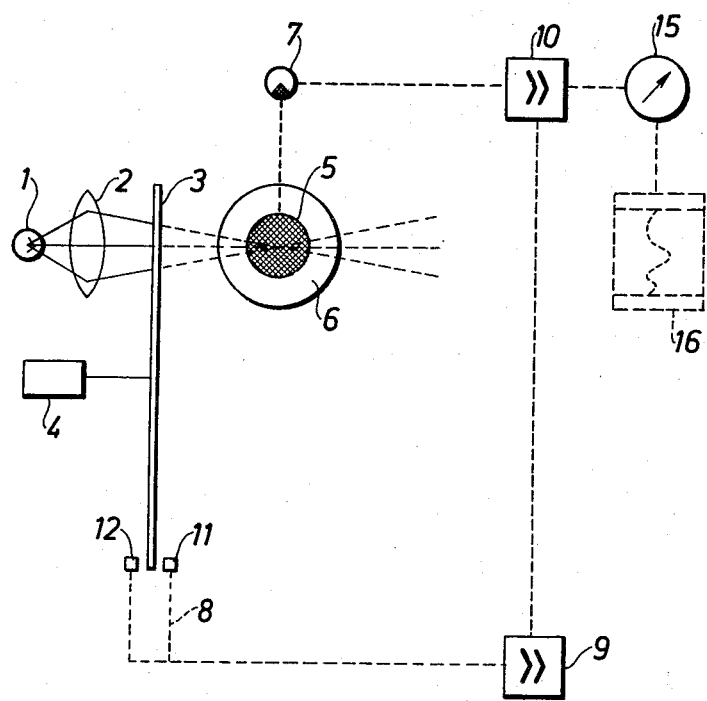

United States Patent [19]                                     [11] 3,694,087
Lindberg                                                       [45] Sept. 26, 1972

[54] SUSPENDED PARTICLE LIGHT REFLECTION MEASUREMENT METHOD AND APPARATUS

[72] Inventor: Arne Robert Lindberg, Slingergatan 18, 431-39 Molndal, Sweden

[22] Filed: Nov. 5, 1970

[21] Appl. No.: 87,078

[52] U.S. Cl. ................... 356/103, 250/218, 356/211
[51] Int. Cl. ............................................. G01n 21/26
[58] Field of Search ...356/103, 208, 36, 37; 250/218

[56] References Cited

UNITED STATES PATENTS 2,237,193   4/1941   Mobsby ..................... 356/103
3,248,551   4/1966   Frommer .................. 356/103

Primary Examiner—Ronald L. Wibert
Assistant Examiner—Orville B. Chew, II
Attorney—Albert M. Parker, Lorimer P. Brooks, Alfred L. Haffner, G. Thomas Delahunty, Harold Hardt and Charles G. Mueller

[57] ABSTRACT

An apparatus and method for measuring the content of material suspended in liquids or the turbidity of liquids by illuminating the liquid with a light source and a photo-electrical registration of the intensity of the reflected light comprising a tubular nozzle arranged to provide a jet of liquid. Said jet of liquid being illuminated through a gap substantially perpendicularly to said jet, whereupon the intensity of the light reflected from particles in said jet is measured at an angle to that at which the light falls.

4 Claims, 2 Drawing Figures

SUSPENDED PARTICLE LIGHT REFLECTION MEASUREMENT METHOD AND APPARATUS

The present invention relates to a method and means for measuring the content of material suspended in continuously flowing liquid, or the turbidity of the liquid.

In many fields there is considerable interest in continuous supervision and determination of the content of particles suspended in a liquid. The difficulties in fulfilling this requirement within these fields of interest have been principally caused by two problems:

a. In most of the known methods of measuring the liquid must flow through a measuring bulb or container where the suspended particles easily form deposits and sediment which cause an unreasonable amount of maintenance work or incorrect measurements.

b. The liquid often contains chemicals dissolved in it which color it. Color variations in the liquid affect the reliability of the results in many measuring methods. For example, in measuring methods based on the light absorption in a liquid, the color intensity affects the measuring result from an exposure point of view.

It has now been found that by means of the present invention it is possible to entirely eliminate the disadvantages mentioned under point (a) and reduce the disadvantages mentioned in point (b) so that they are in practice negligible.

In carrying out the method of the present invention a jet of liquid produced in a nozzle is illuminated through a gap substantially perpendicularly to the jet of liquid, whereupon the intensity of the light reflected from particles in the liquid is measured at an angle to that at which the ray of light falls.

The method proposed according to the present invention may be carried out with a device consisting of a light source, an examining space arranged at a distance from this in the direction of the ray of light, a screening member located between the light source and the examining space and arranged to intermittently screen off the light ray, and a photo-element to register the light reflection, wherein a tubular nozzle is arranged to provide a free jet of liquid from the liquid to be measured in the examining space.

Figure 2:
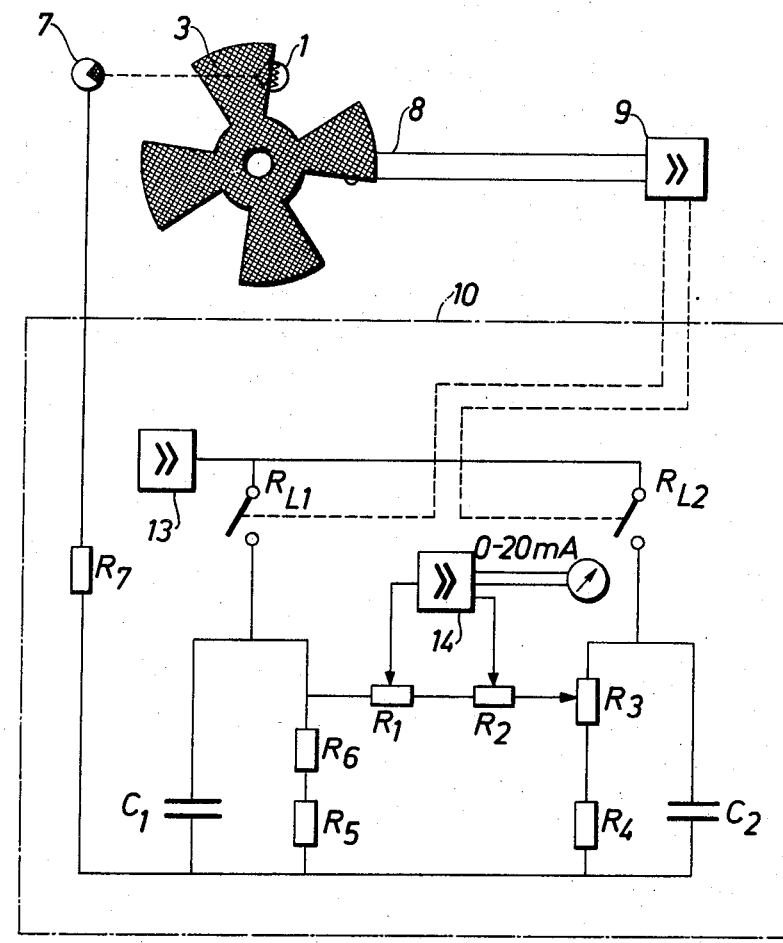

The invention is described in detail as follows, with reference to a preferred embodiment shown in the accompanying drawings, in which FIG. 1 shows a diagrammatic sketch of the device proposed and FIG. 2 a block diagram of the device shown in FIG. 1.

As can be seen from FIG. 1, a light flow is collected from a voltage-stabilized light source 1 and broken in a lens system 2. The light bundle passes a rotating sector disc 3 driven by a motor 4 and having preferably 4 blades, which divides the light flow into light impulses before it reaches a free jet of liquid 5. The latter is produced in a tubular nozzle 6 of "antifouling," i.e., material impeding the growth of bacteria. When the liquid jet 5 containing the suspended particles is illuminated, a light reflection arises around it, the intensity under constant measuring conditions being substantially only dependent on the size, shape, color and number of the particles. If the size, shape and color of the particles are relatively well-defined in a certain medium, the intensity within the normal operating range of the apparatus will be proportional to the quantity of particles suspended in the liquid. The intensity of the reflected light is measured by a photo-electric element 7. The block diagram in FIG. 2 shows the measuring principle for the reflected light. When the sector disc 3 rotates a pulsing light flow shines on the liquid jet 5. The light flow to the photo-element 7 therefore changes from zero to a level corresponding to the quantity of particles in the liquid. A sensing device 8 sees to it with the help of a synchronizing electronic device 9 that the signal from the photo-element 7, amplified in an amplifier 13, is switched alternately to the lefthand bridge part (for dark current) in a measuring bridge 10 or to the righthand bridge part (for measuring current) of the measuring bridge 10. The dark current in the measuring electronic device feeds its bridge part (lefthand) when the light 1 is screened off, and the measuring current its bridge part (righthand) when the liquid jet 5 is illuminated. In order to obtain satisfactory precision, the sensing device 8 consists of two units 11, 12 which take care that neither of the bridge parts is switched in when the light is partially screened, as shown in FIG. 2. The voltage difference between the two branches of the bridge provides a measurement of the intensity of the light reflected in the liquid jet, the operation and aging of the electronic device itself being compensated. The difference between the bridge parts, i.e., across capacitors $C_1$ and $C_2$, is measured in a final amplifier 14 and converted there to a pronounced current signal. The zero point of the apparatus is adjusted in known manner with an adjusting resistor $R_3$ and the measuring region with the adjusting resistors $R_1$ and $R_2$ (rough and accurate adjustement, respectively). $R_{L1}$ and $R_{L2}$ designate relays. Finally, the result is indicated on an indicating measuring instrument 15, which is possibly connected to a recorder 16.

What I claim is:

1. A method of measuring the content of material suspended in a liquid or the turbidity of a liquid comprising: producing a free jet of liquid by means of a nozzle; illuminating said jet of liquid with incident light from a light source by passing said light through a gap substantially perpendicular to the direction of said liquid jet; and photoelectrically measuring the intensity of light reflected at an angle to the direction of said incident light from particles suspended in said liquid jet.

2. Apparatus for measuring the content of material suspended in liquids or the turbidity of liquids comprising: a tubular nozzle for directing a free jet of liquid through an examining space; a light source at a distance from said examining space for directing a ray of light on to the jet of liquid in the examining space; a screening element located between said light source and said examining space for intermittently screening off said light ray from said liquid jet; a photo-sensitive element arranged to receive light reflected from particles in said liquid jet at an angle with respect to said light ray; and means to measure the intensity of said reflected light.

3. The apparatus according to claim 2 wherein said tubular nozzle comprises material impeding the growth of bacteria.

4. The apparatus according to claim 2 wherein said ray of intermittently screened light is directed in a direction substantially perpendicular to the direction of flow of said liquid jet.

* * * * *